United States Patent
Yoshida et al.

(10) Patent No.: US 7,636,663 B2
(45) Date of Patent: Dec. 22, 2009

(54) ON-VEHICLE ACOUSTIC CONTROL SYSTEM AND METHOD

(75) Inventors: Ichiro Yoshida, Takahama (JP); Kazunao Yamada, Kariya (JP)

(73) Assignee: Denso Corporation, Kariya (JP)

( * ) Notice: Subject to any disclaimer, the term of this patent is extended or adjusted under 35 U.S.C. 154(b) by 559 days.

(21) Appl. No.: 11/231,085

(22) Filed: Sep. 20, 2005

(65) Prior Publication Data

US 2006/0074684 A1   Apr. 6, 2006

(30) Foreign Application Priority Data

Sep. 21, 2004   (JP)   .............................. 2004-273395

(51) Int. Cl.
G10L 21/00 (2006.01)
G10L 11/00 (2006.01)
(52) U.S. Cl. ........................ 704/271; 704/275; 704/270
(58) Field of Classification Search ................. 704/200, 704/270, 271, 275
See application file for complete search history.

(56) References Cited

U.S. PATENT DOCUMENTS

| | | | | |
|---|---|---|---|---|
| 6,236,968 B1 * | 5/2001 | Kanevsky et al. | ........... | 704/275 |
| 6,437,689 B2 * | 8/2002 | Kawai et al. | ................. | 340/439 |
| 6,466,232 B1 * | 10/2002 | Newell et al. | ................ | 715/700 |
| 6,853,896 B2 * | 2/2005 | Akiyama | ...................... | 701/36 |
| 7,188,012 B2 * | 3/2007 | Salmeen et al. | ............... | 701/45 |
| 2003/0223604 A1 * | 12/2003 | Nakagawa | .................. | 381/311 |

FOREIGN PATENT DOCUMENTS

| | | |
|---|---|---|
| JP | 07-159190 | 6/1995 |
| JP | 2003-148967 | 5/2003 |
| JP | 2003-339681 | 12/2003 |
| JP | 2004-168202 | 6/2004 |

OTHER PUBLICATIONS

Office Action dated Aug. 5, 2008 in Japanese Application No. 2004-273395 with English translation thereof.

* cited by examiner

*Primary Examiner*—Angela A Armstrong
(74) *Attorney, Agent, or Firm*—Harness, Dickey & Pierce, PLC (57) ABSTRACT

An on-vehicle acoustic control system determines which one of sounds of an audio device and a navigation device should be generated with priority, when both devices are requested to generate respective sounds. The control system further detects a user's physical condition based on an interaction with the user, a picture of the user and biometric information of the user. The control system generates sound in the order of determined priority, and varies the manner of sound generation based on the user's physical condition.

12 Claims, 9 Drawing Sheets

ON-VEHICLE ACOUSTIC CONTROL SYSTEM AND METHOD

CROSS REFERENCE TO RELATED APPLICATION

This application is based on and incorporates herein by reference Japanese Patent Application No. 2004-273395 filed on Sep. 21, 2004.

FIELD OF THE INVENTION

The present invention relates to on-vehicle acoustic control system and method that control sounds in a vehicle by using an AI agent.

BACKGROUND OF THE INVENTION

An on-vehicle control system that controls sounds within a vehicle is disclosed, for example, in JP-7-159190A.

In a vehicle interior, various sounds such as music outputted from an audio device and voice guidance such as route guide outputted from a navigation device coexist. The music and voice guidance are not outputted in a coordinated or balanced manner with each other but are outputted independently of each other. Therefore, for example, if voice guidance from the navigation device is outputted when music from the audio device is being outputted in an extremely high volume, the outputted voice guidance will be buried in the music. The user may not be able to catch the voice guidance. Since these sounds are outputted regardless of user's physical condition, the user may feel that the sound level is not appropriate or miss the voice guidance when the user is in bad physical condition.

SUMMARY OF THE INVENTION

The present has an object to provide an on-vehicle acoustic control system and method that uses an AI agent to control sounds within a vehicle based on user's physical condition, and enable the user to comfortably catch sounds necessary to the user.

According to an on-vehicle acoustic control system and method, when a command is inputted from an on-vehicle electronic control unit (ECU) or an on-vehicle system, the inputted command is analyzed and the priority of sound data is determined. When sound data is inputted from the on-vehicle ECU or the on-vehicle system, a sound corresponding to the inputted sound data is outputted based on the priority of the sound data. An artificial intelligence (AI) agent selectively executes a user mode and a vehicle mode. The user mode detects user's physical condition. The vehicle mode outputs a sound corresponding to the sound data outputted from the on-vehicle ECU or the on-vehicle system. When executing the vehicle mode, the AI agent acoustically controls a sound corresponding to sound data outputted from the on-vehicle ECU or the on-vehicle system based on the user's physical condition detected in the user mode thereby outputting the controlled sound.

Thus, a sound corresponding to sound data outputted from the on-vehicle ECU or the on-vehicle system is acoustically controlled based on the user's physical condition before being output. When it is determined that the user is in bad physical condition (for example, has a symptom such as headache, stomachache, or diarrhea), to enable the user to correctly catch sounds, sounds within the vehicle can be properly controlled based on the user's physical condition by increasing the volume and slowing the pronunciation timing and pronunciation speed. Thus, the user can correctly catch sounds necessary to the user.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
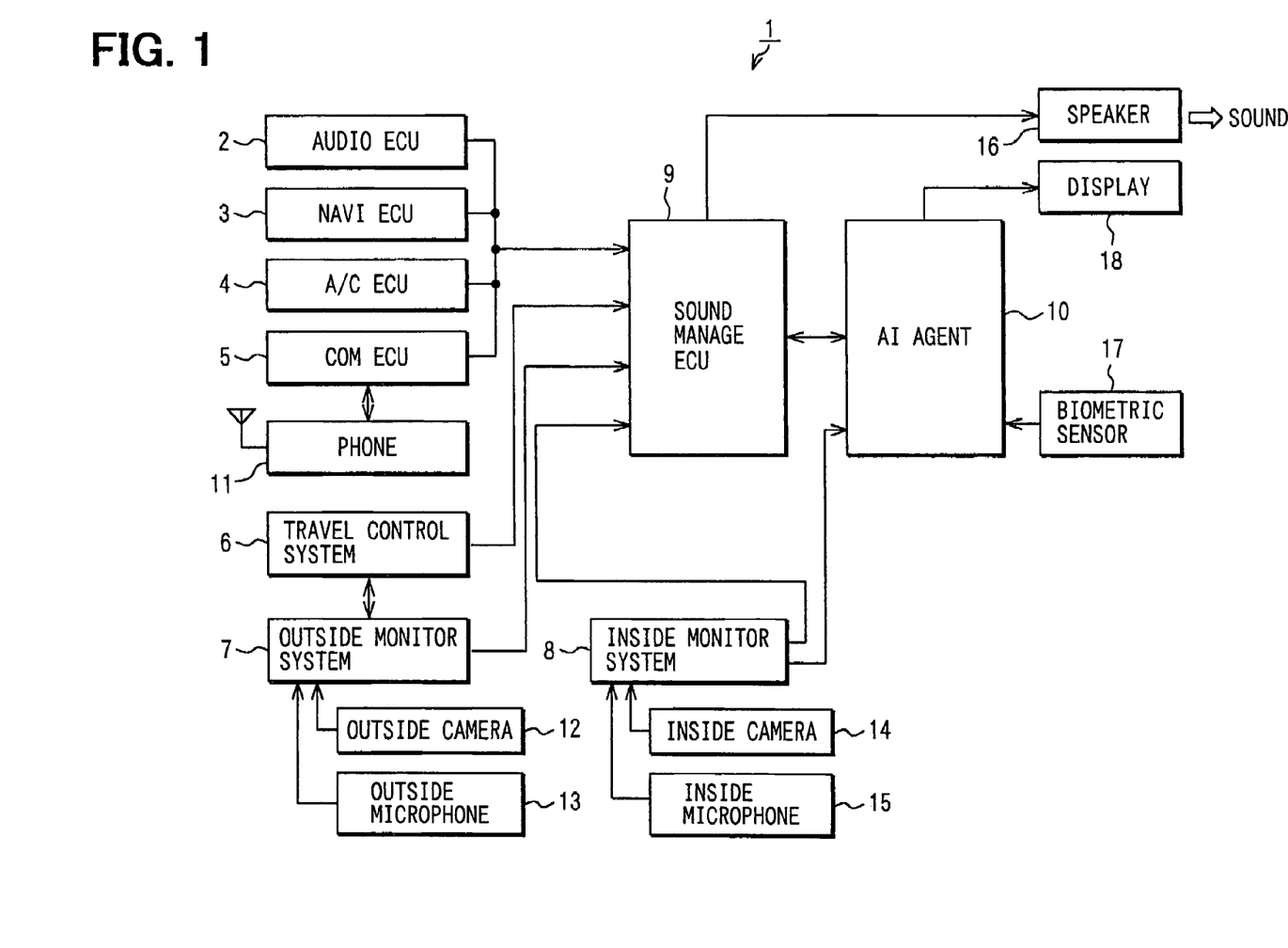
FIG. 1 is a block diagram showing an on-vehicle acoustic control system according to an embodiment of the present invention.

Referring first to FIG. 1, an on-vehicle acoustic control system 1 includes an audio ECU 2, a navigation ECU 3, an air-conditioner (A/C) ECU 4, a communication ECU 5, a travel control system 6, an outside monitoring system 7, an inside monitoring system 8, a sound management ECU 9, and an artificial intelligence (AI) agent 10. The on-vehicle ECUs 2 to 5 and the on-vehicle systems 7 and 8 are on-vehicle devices.

The audio ECU 2 outputs sound data regarding audio devices such as music CD and music MD to the sound management ECU 9. The navigation ECU 3 outputs sound data regarding navigation such as route guidance and destination setting to the sound management ECU 9. The air-conditioner ECU 4 outputs sound data regarding overall operations of an air-conditioner to the sound management ECU 9. The communication ECU 5 has an interface with a cellular phone 11, and outputs sound data regarding overall operations of the cellular phone 11 to the sound management ECU 9. These on-vehicle ECUs 2 to 5 output a command representative of a request to output sound data to the sound management ECU 9 and waits for a message representative of the input of a response representative of permission to output sound data from the sound management ECU 9. When the response is inputted from the sound management ECU 9, the on-vehicle ECUs 2 to 5 output respective permitted sound data to the sound management ECU 9.

The travel control system 6 outputs sound data regarding overall travel control to the sound management ECU 9. The outside monitoring system 7 captures vehicle outside images photographed by an outside photographing camera 12 and outside sounds collected by an outside microphone 13. The system 7 thus monitors the vehicle outside condition based on the captured outside images and sounds. The inside monitoring system 8 captures vehicle inside images photographed by an inside photographing camera 14 and inside sounds collected by an inside microphone 15. The system 8 thus monitors the vehicle inside condition based on the captured inside images and sounds.

In this case, the inside photographing camera 14 also photographs a user in the vehicle. These on-vehicle systems 6 to 8, like the on-vehicle ECUs 2 to 5, output a command representative of a request to output sound data to the sound management ECU 9 and waits for a message representative of the input of a response representative of permission to output sound data from the sound management ECU 9. When the response is inputted from the sound management ECU 9, the on-vehicle systems 6 to 8 output respective permitted sound data to the sound management ECU 9.

When a command is inputted from any of the on-vehicle ECUs 2 to 5 or the on-vehicle systems 6 to 8, the sound management ECU 9 analyzes the inputted commands to determine the priority of sound data. Based on the determination result, the sound management ECU 9 outputs a response representative of permission to output the sound data to the on-vehicle ECUs 2 to 5 or the on-vehicle systems 6 to 8, while outputting the command data indicating that the command has been inputted, to the AI agent 10. When sound data is inputted from any of the on-vehicle ECUs 2 to 5 or the on-vehicle systems 6 to 8, the sound management ECU 9 outputs a sound corresponding to the inputted sound data from a loudspeaker 16 based on the priority of the sound data.

The AI agent 10 has the function of interacting with the user. Specifically, the AI agent 10 has an interactive control program which analyzes sounds collected by the inside microphone 15 according to the algorithm of the interactive control program. It produces an interactive sound based on the analysis result, and outputs the produced interactive sound from the loudspeaker 16 by the sound management ECU 9 to interact with the user. The AI agent 10 has the function of analyzing user's images photographed by the inside photographing camera 14 and the function of analyzing user's biometric information measured by a biometric sensor 17.

The AI agent 10 recognizes user's physical condition based on a result of interaction with the user, the user's photographic images, and the user's biometric information. It outputs from the loudspeaker 16 a sound corresponding to the sound data outputted to the sound management ECU 9 from the on-vehicle ECUs 2 to 5 or the on-vehicle systems 6 to 8 after acoustically controlling it based on the user's physical condition. The biometric information here refers to body temperature, blood pressure, pulse rate, heart rate, and the like. The AI agent 10 is connected to a display 18 and displays a required display screen on the display 18.

Figure 2:
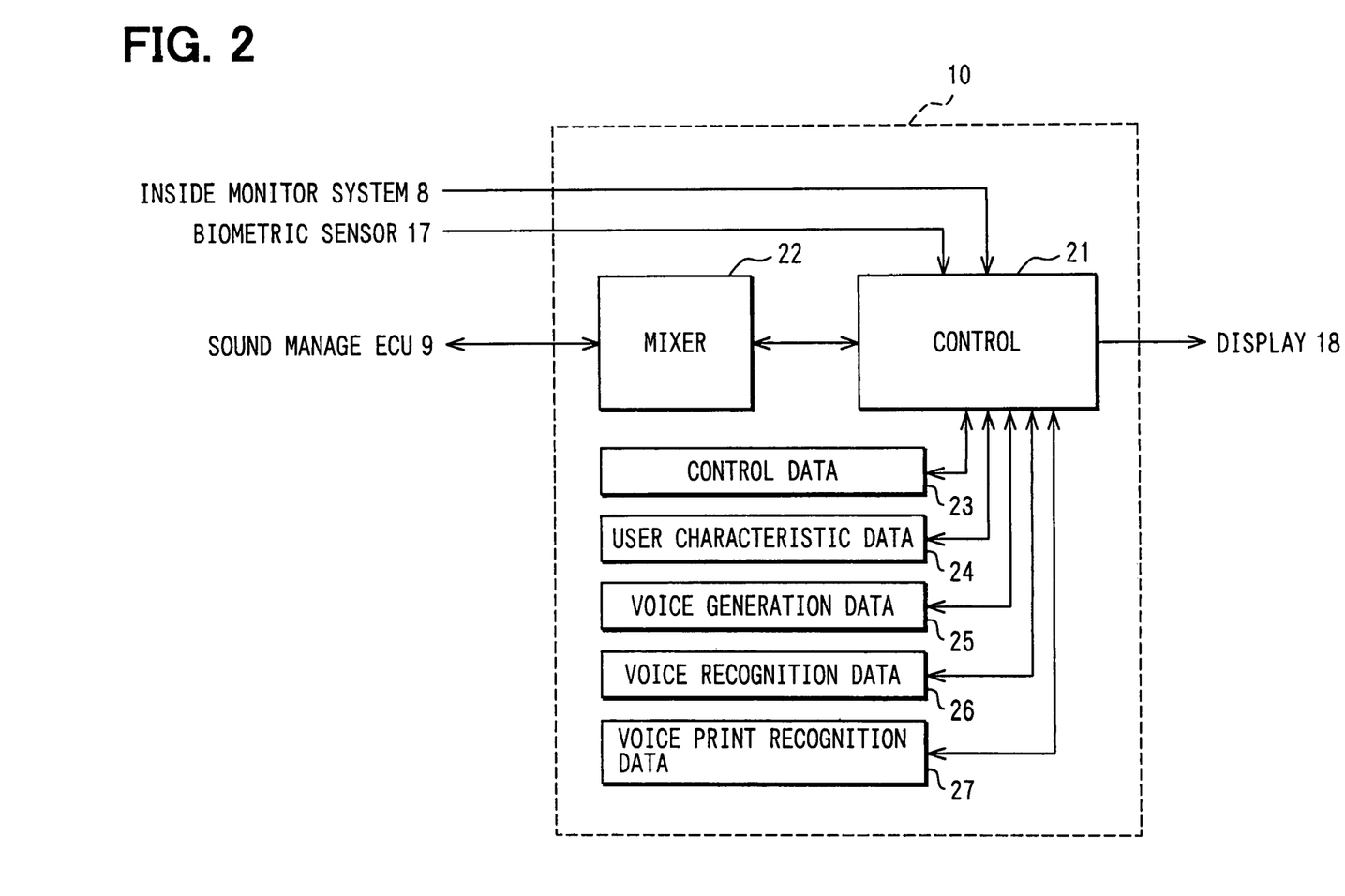
FIG. 2 is a block diagram showing an AI agent in the embodiment.

As shown in FIG. 2, the AI agent 10 comprises a control unit 21 that controls the operation of the AI agent 10, a mixer 22 that mixes sound data inputted from the sound management ECU 9, a control data memory 23 that stores control data, a user characteristic data memory 24 that stores user performance data representative of user's characteristics, a voice generation data memory 25 that stores voice generation data, a voice recognition data memory 26 that stores voice recognition data, and a voiceprint recognition data memory 27 that stores voiceprint recognition data. The data stored in these data memories 23 to 28 is used by the AI agent 10 to recognize user's physical condition based on a result of interaction with the user. In short, the AI agent 10 can recognize user's physical condition by comparing data obtained by interaction with the user, and data indicating user's good physical condition that is stored in the data memories 23 to 28.

The AI agent 10 may also be constructed integrally with the sound management ECU 9. It may also be constructed in the form of a soft module within the inside monitoring system 8. It may also be constructed in the form of an independent ECU. It may also be formed on a programmable device called a reconfigurable chip. The outside photographing camera 12 may includes a fisheye lens and a wide-angle lens to enable photographing in all circumferential directions outside the vehicle, or may be provided with plural cameras. Moreover, the outside microphone 13 may be provided with plural microphones so that sounds in all circumferential directions outside the vehicle can be collected.

Figure 3:
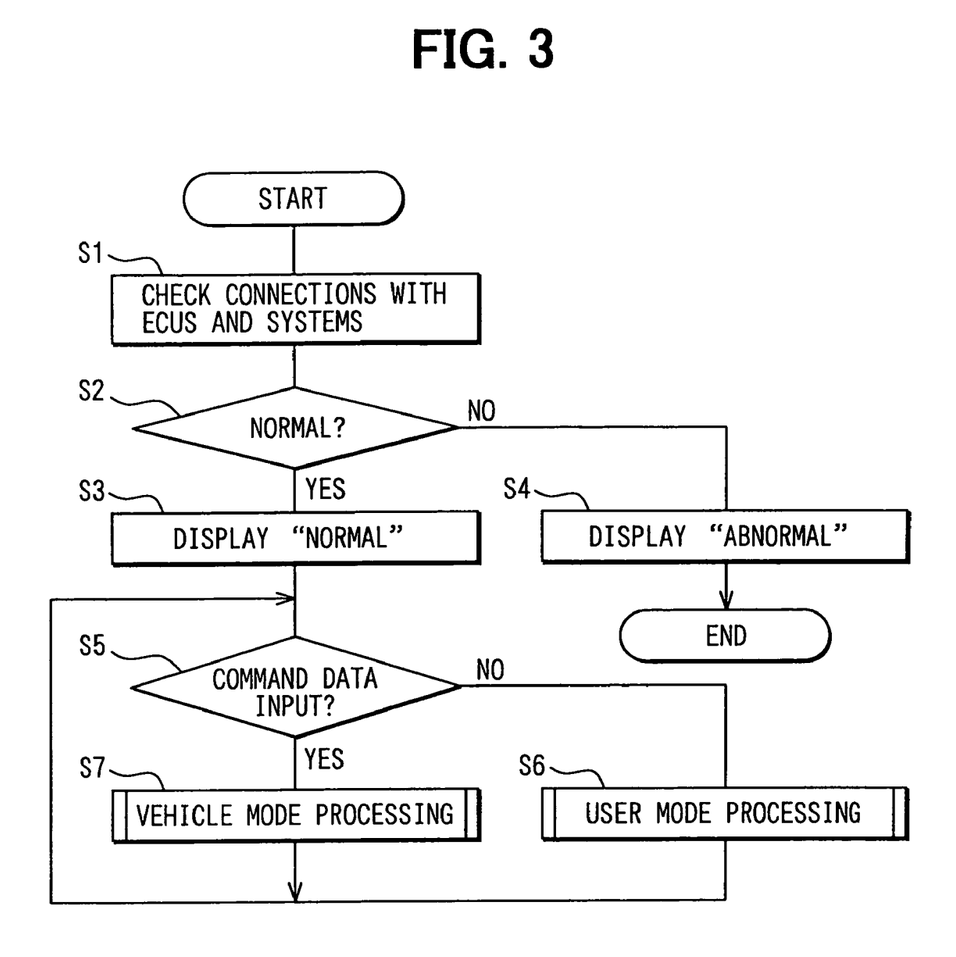
FIG. 3 is a flowchart showing processing performed by the AI agent.

When the control system starts operation, the AI agent 10 checks the connection among the on-vehicle ECUs 2 to 5, the on-vehicle systems 6 to 8, and the sound management ECU 9 (step S1), and determines whether the connection is normal (step S2). On determining that the connection among the on-vehicle ECUs 2 to 5, the on-vehicle systems 6 to 8, and the sound management ECU 9 is normal (YES at step S2), the AI agent 10 displays in the display 18 a normal message indicating that the connection is normal, for example, a message "The connection is normal" (step S3), thereby notifying the user that the connection is normal.

On the other hand, on determining that the connection among the on-vehicle ECUs 2 to 5, the on-vehicle systems 6 to 8, and the sound management ECU 9 is abnormal (NO at step S2), the AI agent 10 displays in the display 18 an error message indicating that the connection is abnormal, for example, a message "The connection is abnormal" (step S4), thereby notifying the user that the connection is abnormal.

After the AI agent 10 displays in the display 18 a normal message indicating that the connection is normal, the AI agent 10 determines whether command data has been inputted from the sound management ECU 9 to determine whether a command has been outputted to the sound management ECU 9 from the on-vehicle ECUs 2 to 5 or the on-vehicle systems 6 to 8 (step S5).

On detecting that a command has not been outputted to the sound management ECU 9 from the on-vehicle ECUs 2 to 5 or the on-vehicle systems 6 to 8 (NO at step S5), the AI agent 10 proceeds to user mode processing (step S6) to execute a predetermined user mode. On the other hand, on detecting that a command has been outputted to the sound management ECU 9 from the on-vehicle ECUs 2 to 5 or the on-vehicle systems 6 to 8 (YES at step S5), the AI agent 10 proceeds to vehicle mode processing (step S7) to execute a predetermined vehicle mode.

Figure 4:
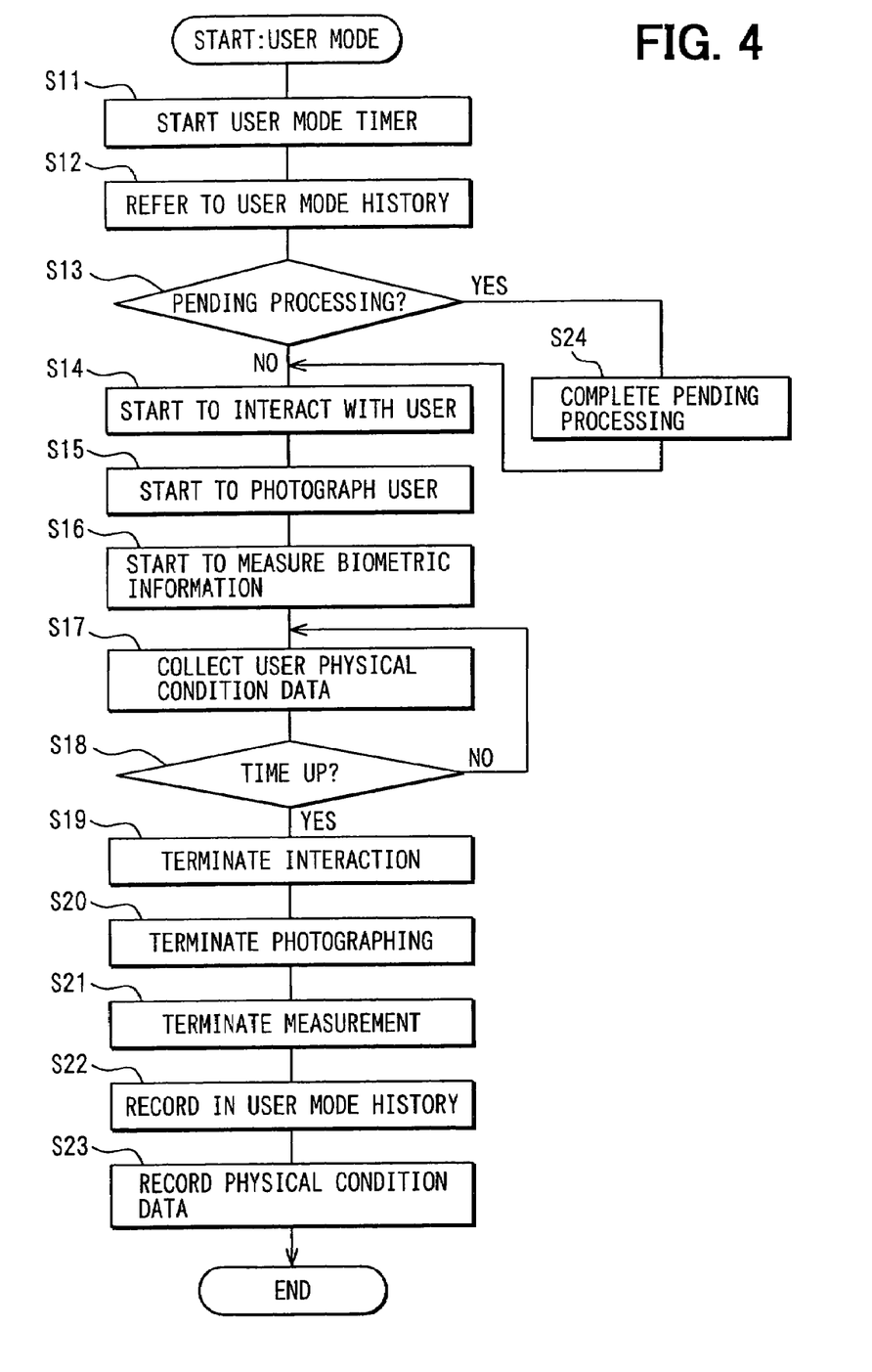
FIG. 4 is a flowchart showing processing performed by the AI agent.

The user mode processing (step S6) is executed as shown in FIG. 4. When the AI agent 10 proceeds to the user mode processing, it starts a user mode timer in which a measurement time is set in advance (step S11). The AI agent 10 refers to or refers to a user mode history (step S12), and determines whether the pending (unfinished) processing during previous execution of the user mode exists (step S13).

On detecting that pending processing during previous execution of the user mode does not exist (NO at step S13), the AI agent 10 starts interaction with the user by the inside microphone 15 and the loudspeaker 16 (step S14), starts to photograph the user by the inside photographing camera 14 (step S15), and starts to measure user's biometric information by the biometric sensor 17 (step S16). The AI agent 10 analyzes a result of interaction with the user, user's photographic images, and user's biometric information until detecting that the user mode timer times up, and collects user's physical condition data numerically representing user's physical condition (step S S17 and S18).

As a result of interaction with the user, the AI agent 10 determines the way of talk, intonation, accent, and the condition and pitch of voice. As user's photographic images, it determines user's facial expressions, the movement of the eyes, and the movement of the mouth. As user's biometric information, it determines the blood pressure, pulse rate, and heart rate of the user. By doing so, the AI agent 10 collects the user's physical condition data. That is, the AI agent 10 determines that the user is in poor physical condition (tired), for example, when user's way of talk is heavier than usual (when user's physical condition is good), when user's facial expressions are duller than usual, or when a user's blood pressure is higher than usual.

The AI agent 10 may divide user's physical condition into several levels to interact with the user according to the levels. Specifically, when the user is slightly tired, the AI agent 10 interacts with the user in such a tone to heal the user. When the user is moderately tired, it interacts with the user in such a tone to awake the user. When the user is heavily tired, it interacts with the user in such a tone to inspire the user. Besides interaction with the user, the AI agent 10 may control the air-conditioner to achieve such a temperature, wind quantity, and wind direction as to make the user comfortable.

On detecting that the user mode timer times up (YES at step S18), the AI agent 10 terminates interaction with the user by the inside microphone 15 and the loudspeaker 16 (step S19), terminates user photographing by the inside photographing camera 14 (step S20), and terminates the measurement of user's biometric information by the biometric sensor 17 (step S21). The AI agent 10 records a portion not processed (e.g., midway portion of interaction) in user mode history (step S22), and records user's physical condition data having been collected so far (step S23). On detecting that pending processing during previous execution of the user mode exists (YES at step S13), the AI agent 10 completes pending processing, that is, a portion not processed during the previous execution of the user mode (step S24), and performs the above-mentioned processings after step S13.

By the above series of processings, the AI agent 10 executes the user mode if a command is not outputted in the timing that monitors whether the command is outputted to the sound management ECU 9 from the on-vehicle ECUs 2 to 5 or the on-vehicle systems 6 to 8, analyzes a result of interaction with the user, user's photographic images, and user's biometric information, and collects user's physical condition data representative of user's physical condition.

Figure 5:
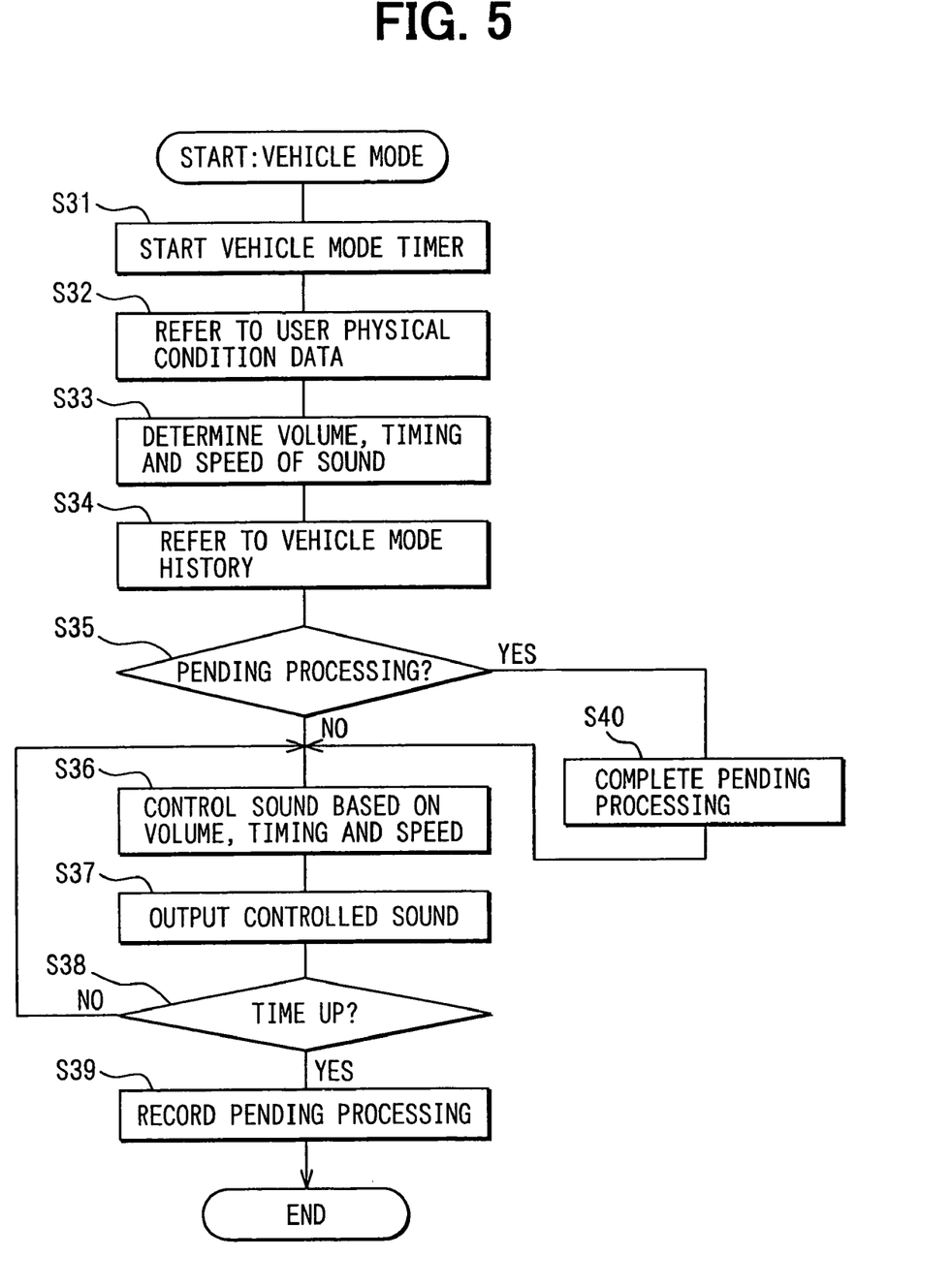
FIG. 5 is a flowchart showing processing performed by the AI agent.

The vehicle mode processing is executed as shown in FIG. 5. On proceeding to the vehicle mode processing, the AI agent 10 starts the vehicle mode timer in which a measurement time is previously set (step S31). The AI agent 10 refers to user's physical condition data recorded by executing the user mode (step S32), and determines the volume, pronunciation timing, and pronunciation speed of a sound corresponding to sound data outputted to the sound management ECU 9 from the on-vehicle ECUs 2 to 5 or the on-vehicle systems 6 to 8 (step S33). The AI agent 10 refers to the vehicle mode history (step S34) to determine whether pending processing during previous execution of the vehicle mode exists (step S35).

On detecting that pending processing during previous execution of the vehicle mode does not exist (NO at step S35), until detecting that the vehicle mode timer times up, the AI agent 10 acoustically controls the sound corresponding to sound data outputted to the sound management ECU 9 from the on-vehicle ECUs 2 to 5 or the on-vehicle systems 6 to 8 based on the previously determined volume, pronunciation timing, and pronunciation speed, and outputs the acoustically controlled sound from the loudspeaker 16 (step S S36, S37, and S38).

On detecting that the vehicle mode timer times up (YES at step S38), the AI agent 10 records a portion not processed (midway portion of sound data) in vehicle mode history (step S39). On detecting that pending processing during previous execution of the vehicle mode exists (YES at step S35), the AI agent 10 processes a portion not processed during the previous execution of the vehicle mode (step S40), and performs the above processing from step S36.

By the above series of processing, the AI agent 10 executes the vehicle mode if a command is outputted in the timing that monitors whether the command is outputted to the sound management ECU 9 from the on-vehicle ECUs 2 to 5 or the on-vehicle systems 6 to 8, and outputs a sound corresponding to the sound data outputted to the sound management ECU 9 from the on-vehicle ECUs 2 to 5 or the on-vehicle systems 6 to 8 from the loudspeaker 16 after acoustically controlling it based on the user's physical condition. Therefore, for example, if it is determined that the user is in bad physical condition, to enable the user to correctly catch sounds, sounds within the vehicle can be properly controlled based on the user's physical condition by increasing the volume and slowing down the pronunciation timing and pronunciation speed. Thus, the user can correctly catch sounds necessary to the user.

In the above embodiment, user's physical condition is detected based on a result of interaction with the user, the user's photographic images and the user's biometric information. However, user's physical condition may not be detected based on all of these three conditions. Any one of these three conditions may be selected to detect user's physical condition.

Figure 6:
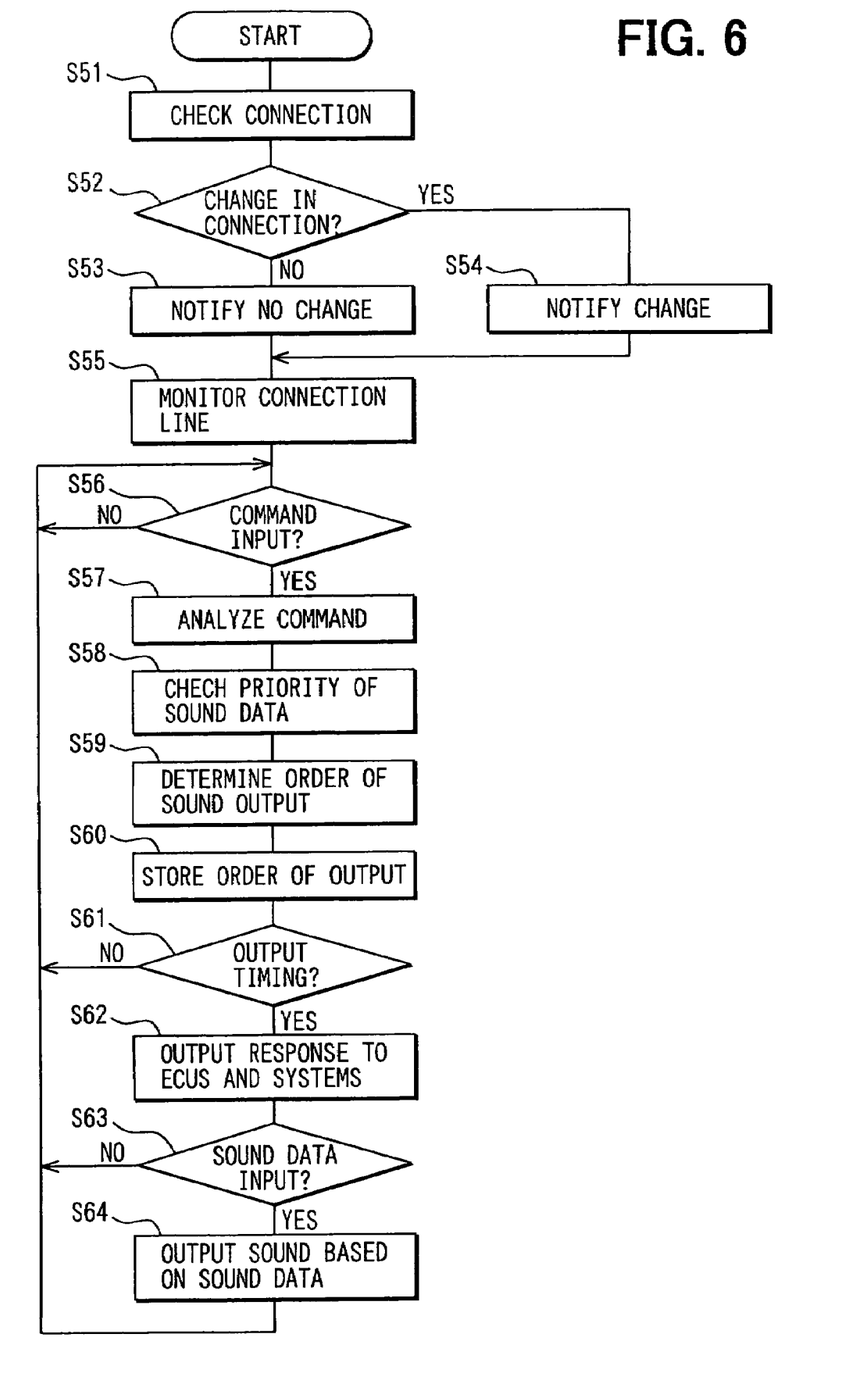
FIG. 6 is a flowchart showing processing performed by a sound management ECU in the embodiment.
Figure 7:
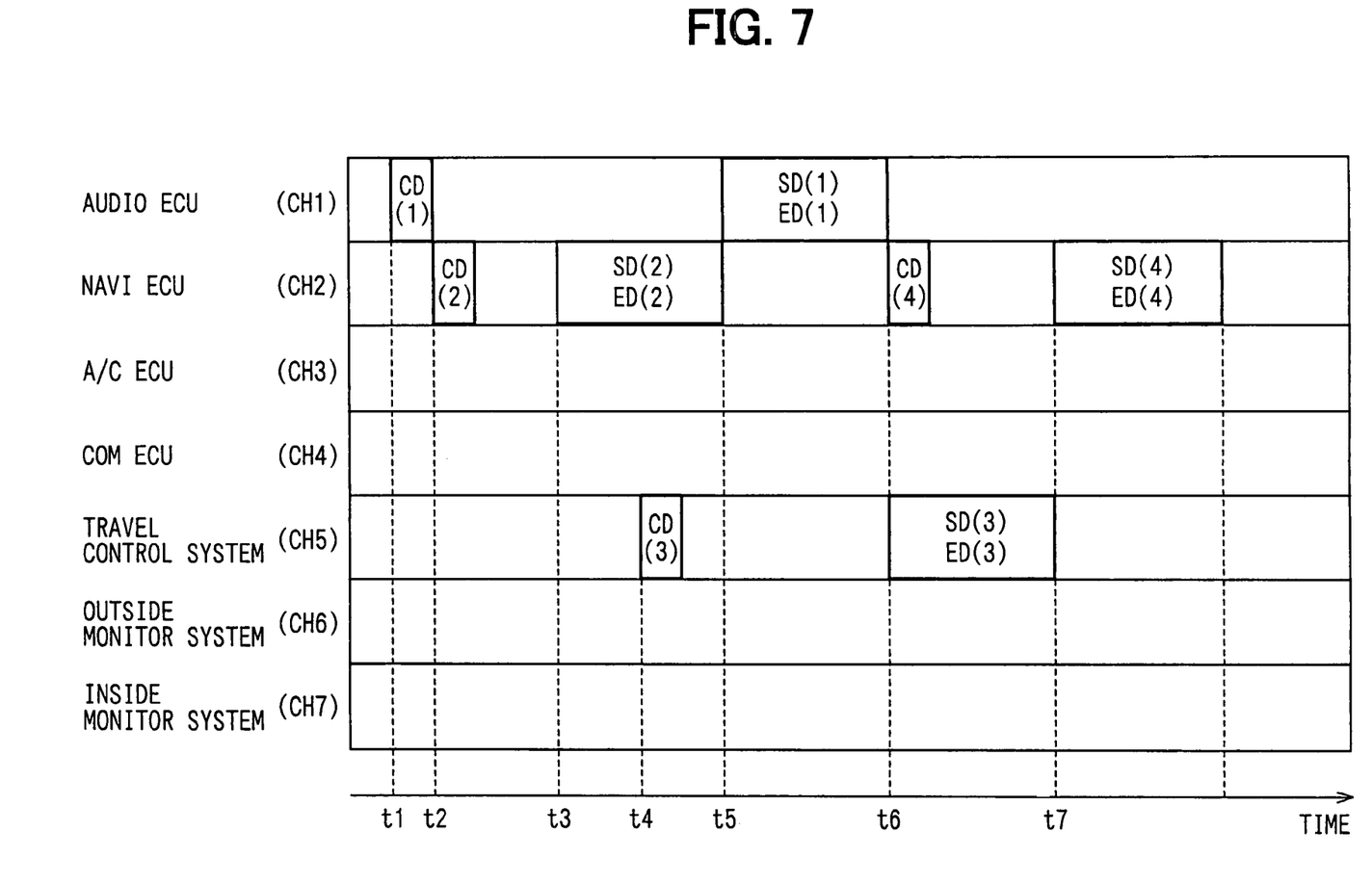
FIG. 7 is an operation diagram showing a state in which commands and sound data are outputted to a sound management ECU from on-vehicle ECUs and on-vehicle systems in the embodiment.

The sound management ECU 9 executes its processing as shown in FIGS. 6 and 7. When a command is inputted from the on-vehicle ECUs 2 to 5 or the on-vehicle systems 6 to 8, the sound management ECU 9 analyzes the inputted command to determine the priority of corresponding sound data. When the sound data is inputted from the on-vehicle ECUs 2 to 5 or the on-vehicle systems 6 to 8, outputs a sound corresponding to the inputted sound data from the loudspeaker 16 based on the priority of the sound data.

In FIG. 6, the sound management ECU 9 checks the connection with the on-vehicle ECUs 2 to 5 and the on-vehicle systems 6 to 8 (step S51), and determines whether a change occurs in the connection with the on-vehicle ECUs 2 to 5 and the on-vehicle systems 6 to 8 (step S52). When the sound management ECU 9 detects that there is no change in the connection with the on-vehicle ECUs 2 to 5 and the on-vehicle systems 6 to 8 (NO at step S52), it notifies the AI agent 10 that there is no change in the connection with the on-vehicle ECUs 2 to 5 and the on-vehicle systems 6 to 8 (step S53). On the other hand, when the sound management ECU 9 detects that there is a change in the connection with the on-vehicle ECUs 2 to 5 and the on-vehicle systems 6 to 8 (YES at step S52), it notifies the AI agent 10 that there is a change in the connection with the on-vehicle ECUs 2 to 5 and the on-vehicle systems 6 to 8 (step S54).

The sound management ECU 9 monitors connection lines (connection ports) with the on-vehicle ECUs 2 to 5 and the on-vehicle systems 6 to 8 (step S55) to determine from which of the on-vehicle ECUs 2 to 5 and the on-vehicle systems 6 to 8 the command is inputted (step S56). On detecting from which of the on-vehicle ECUs 2 to 5 and the on-vehicle systems 6 to 8 the command is inputted (YES at step S56), the sound management ECU 9 analyzes the inputted command (step S57). The sound management ECU 9 determines the priority of the sound data (step S58), determines an output order of the sound corresponding to the sound data based on the determined priority of the sound data (step S59), and stores the determined output order of sound in the time line memory (step S60). The time line memory represents a time-series output order of sounds corresponding to sound data outputted to the sound management ECU 9 from the on-vehicle ECUs 2 to 5 or the on-vehicle systems 6 to 8, the sounds being outputted from the loudspeaker 16.

On detecting that the output timing of the relevant sound is reached (YES at step S61), the sound management ECU 9 outputs a response representative of permission to output the sound to relevant on-vehicle ECUs 2 to 5 and on-vehicle systems 6 to 8 (step S62). On detecting that sound data is inputted from the relevant on-vehicle ECUs 2 to 5 and on-vehicle systems 6 to 8 (YES at step S63), the sound management ECU 9 outputs a sound corresponding to the inputted sound data from the loudspeaker 16 (step S64). In this case, the sound outputted from the loudspeaker 16 by the sound management ECU 9 is acoustically controlled based on the user's physical condition by the AI agent 10.

According to the above embodiment, as shown in FIG. 7, when a command CD(1) is inputted at t1 from the audio ECU 2, and a command CD(2) is inputted at t2 from the navigation ECU 3, the sound management ECU 9 compares the priority of sound data SD(1) outputted from the audio ECU 2 with the priority of sound data SD(2) outputted from the navigation ECU 3. When the latter is higher than the former, the sound management ECU 9 outputs a sound corresponding to the sound data SD(2) outputted from the navigation ECU 3 from the loudspeaker 16 at t3, then outputs a sound corresponding to the sound data SD(1) outputted from the audio ECU 2 from the loudspeaker 16 at t5.

When a command CD(3) is inputted from the outside monitoring system 7 at t4, the sound management ECU 9 compares the priority of sound data SD(1) outputted from the audio ECU 2, the priority of sound data SD(2) outputted from the navigation ECU 3, and the priority of sound data SD(3) outputted from the outside monitoring system 7. When the priority of sound data SD(3) outputted from the outside monitoring system 7 is lower than the priority of sound data SD(2) outputted from the navigation ECU 3 and the priority of sound data SD(1) outputted from the audio ECU 2, the sound management ECU 9 outputs a sound corresponding to the sound data SD(2) outputted from the navigation ECU 3 at t3 from the loudspeaker 16, outputs a sound corresponding to the sound data outputted from the audio ECU 2 at t5 from the loudspeaker 16, then outputs a sound corresponding to the sound data SD(3) outputted by the outside monitoring system 7 at t6 from the loudspeaker 16. In FIG. 7, effect data ED(1) to ED(4) is data representative of the effect of the sound data SD(1) to SD(4).

Figure 8:
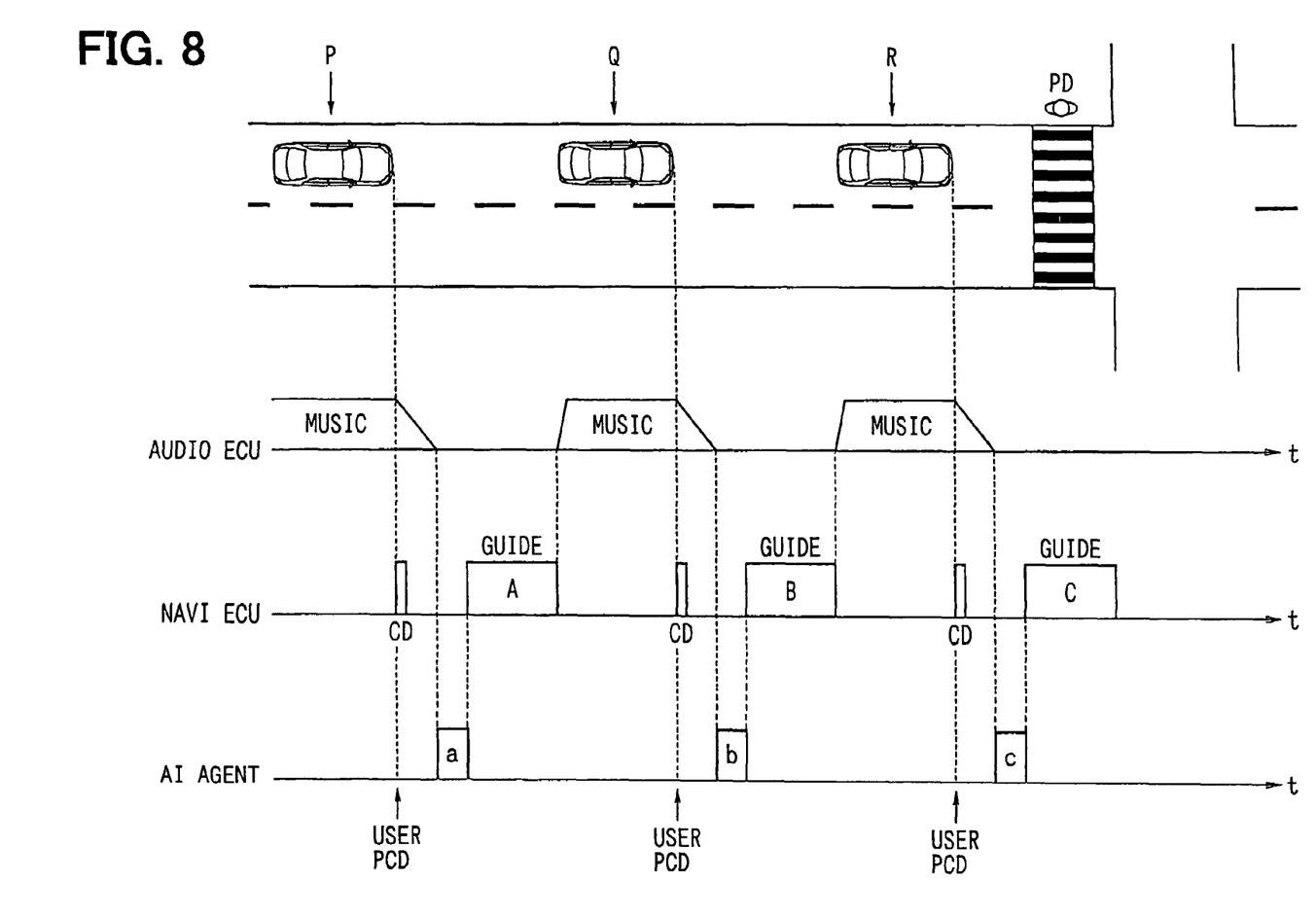
FIG. 8 is an operation diagram schematically showing a state in which voice guidance of a navigation ECU is reproduced in the embodiment.
Figure 9:
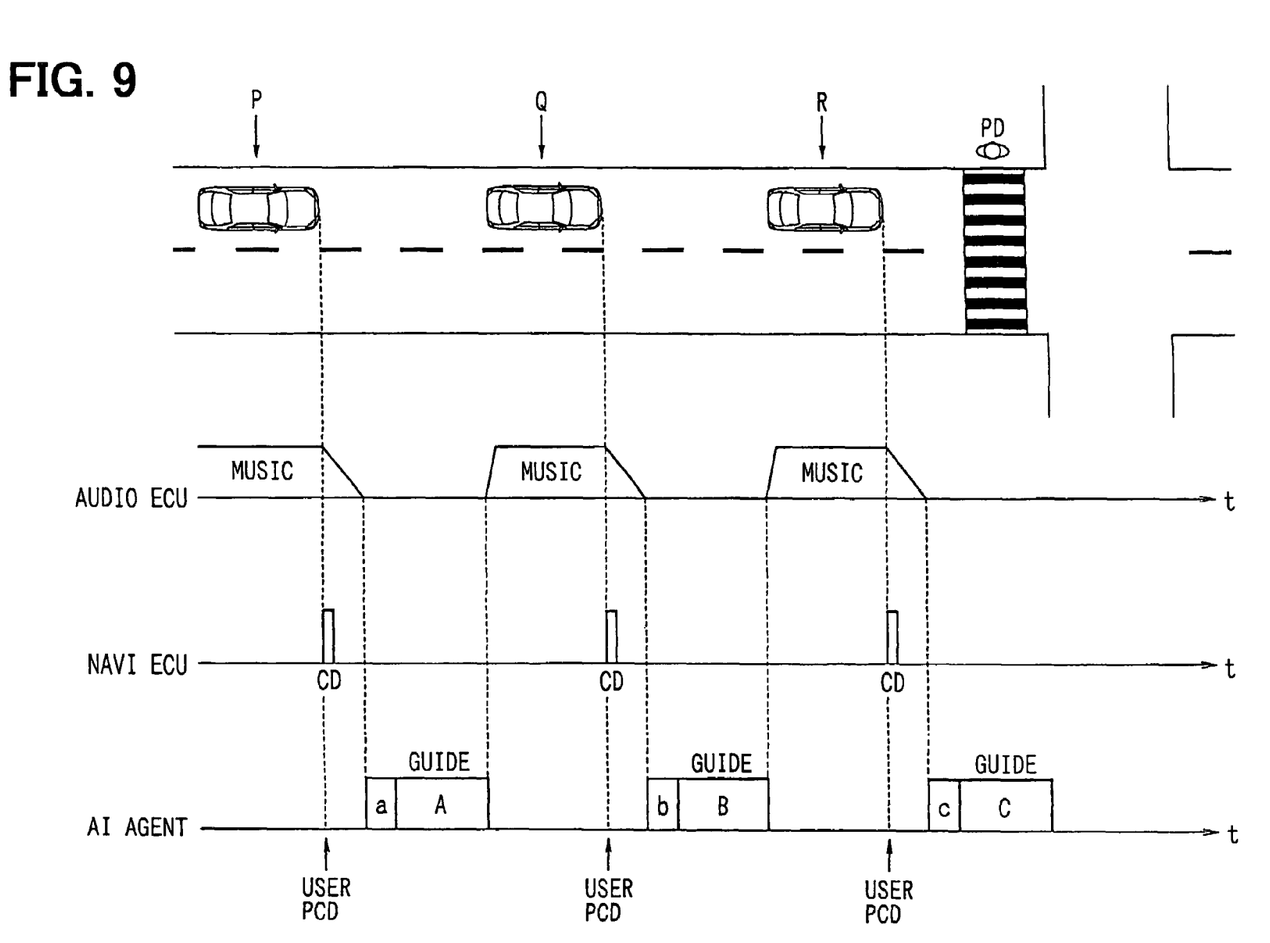
FIG. 9 is an operation diagram schematically showing a state in which voice guidance of the navigation ECU is reproduced.

FIGS. 8 and 9, as an example of the above processing, schematically show sound output patterns when the navigation ECU 3 reproduces voice guidance. In this example, a description will be made of the management of sound output of voice guidance reproduced in the navigation ECU 3 for each of the case (FIG. 8) where the navigation ECU 3 performs it, and the case (FIG. 9) where the AI agent 10 performs it.

In FIG. 8, the navigation ECU 3 manages the sound output of voice guidance reproduced in the navigation ECU 3. On detecting that the distance between the subject vehicle and an intersection is e.g., 1 km (a travel position of the subject vehicle is a position indicated by P in FIG. 8), the navigation ECU 3 outputs a command CD representative of a request to output voice guidance to the sound management ECU 9. On detecting that a command is outputted to the sound management ECU 9 from the navigation ECU 3, the AI agent 10 executes the vehicle mode as described above, refers to user's physical condition data PCD, and determines the volume, pronunciation timing, and pronunciation speed of a voice guidance outputted from the navigation ECU 3.

Moreover, the AI agent 10 lowers the volume of music reproduced in the audio ECU 2, and according to the determined volume, pronunciation timing, and pronunciation speed, reproduces and outputs, e.g., a prior notice voice message "A voice guidance is reproduced in the navigation apparatus." by its own interactive function from the loudspeaker 16 ("a" in FIG. 8), then reproduces, e.g., a voice guidance "1 kilometer from an intersection" in the navigation ECU 3 and outputs it from the loudspeaker 16 ("A" in FIG. 8).

Similarly, when the distance between subject vehicle and an intersection is e.g., 500 meters (a travel position of subject vehicle is a position indicated by "Q" in FIG. 8), the AI agent 10 refers to user's physical condition data, and determines the volume, pronunciation timing, and pronunciation speed of a voice guidance outputted from the navigation ECU 3. Moreover, the AI agent 10 lowers the volume of music reproduced in the audio ECU 2, and according to the determined volume, pronunciation timing, and pronunciation speed, reproduces and outputs, e.g., a prior notice voice message "A voice guidance is reproduced in the navigation apparatus." by its own interactive function from the loudspeaker 16 ("b" in FIG. 8), then reproduces, e.g., a voice guidance "500 meters from an intersection" in the navigation ECU 3 and outputs it from the loudspeaker 16 ("B" in FIG. 8).

When subject vehicle gets near an intersection in which a pedestrian exists (a travel position of subject vehicle is a position indicated by "R" in FIG. 8), the AI agent 10 refers to user's physical condition data, and determines the volume, pronunciation timing, and pronunciation speed of a voice guidance outputted from the navigation ECU 3. Moreover, the AI agent 10 lowers the volume of music reproduced in the audio ECU 2, and according to the determined volume, pronunciation timing, and pronunciation speed, reproduces, e.g., a prior notice voice message "A voice guidance is reproduced in the navigation apparatus." by its own interactive function and outputs it from the loudspeaker 16 ("c" in FIG. 8), then reproduces, e.g., a voice guidance "There is a pedestrian. Pay attention to the pedestrian." in the navigation ECU 3 and outputs it from the loudspeaker 16 ("C" in FIG. 8).

Next, FIG. 9 shows the case where the AI agent 10 manages the sound output of a voice guidance reproduced in the navigation ECU 3. In this case, instead of reproducing a voice guidance in the navigation ECU 3, the AI agent 10 captures voice guidance data from the navigation ECU 3 to reproduce a prior notice voice message by its own interactive function and output it from the loudspeaker 16, then reproduces the voice guidance data by itself and outputs a voice guidance from the loudspeaker 16.

By the above series of processing, the AI agent 10 acoustically controls a voice guidance from the navigation ECU 3 based on the user's physical condition and outputs it from the loudspeaker 16. For example, if it is determined that the user is in bad physical condition, to enable the user to correctly catch a voice guidance, the volume is increased, and the pronunciation timing and pronunciation speed are slowed. Thus, the user can correctly catch the voice guidance of the navigation ECU 3.

As described above, according to this embodiment, in the on-vehicle acoustic control system 1, user's physical condition is determined from a result of interaction with the user (e.g., the way of talk, intonation, accent, and the condition and pitch of voice), user's photographic images (e.g., user's facial expressions, the movement of eyes, and the movement of mouse), and user's biometric information (e.g., body heat, blood pressure, pulse rate, and heart rate), and a sound corresponding to sound data outputted to the sound management ECU 9 from the on-vehicle ECUs 2 to 5 or the on-vehicle systems 6 to 8 is acoustically controlled based on the user's physical condition and outputted from the loudspeaker 16. Therefore, for example, if it is determined that the user is in bad physical condition, to enable the user to correctly catch sounds, sounds within the vehicle can be properly controlled based on the user's physical condition by increasing the volume and slowing the pronunciation timing and pronunciation speed. Thus, the user can correctly catch sounds necessary to the user.

The present invention is not limited only to the above embodiment, and may be modified.

For instance, the whole system (kinds of on-vehicle ECUs and on-vehicle systems connected to the sound management ECU, the number of loudspeakers, etc.) may be different from that of the embodiment.

The system may be constructed to detect road noise to perform acoustic control, taking a result of detecting road noise into account. Also, the system may be constructed to detect the type of loudspeaker to perform acoustic control, taking a result of detecting the type of loudspeaker into account.

In the AI agent, a sound corresponding to sound data outputted to the sound management ECU from the on-vehicle ECUs and the on-vehicle systems may be acoustically controlled in conjunction with travel control operation. In such a construction, sounds within the vehicle can be acoustically controlled in conjunction with steering operation, brake operation, and accelerator operation.

What is claimed is:

1. An on-vehicle acoustic control system comprising:
   on-vehicle devices including at least one of on-vehicle ECUs and on-vehicle systems that output a command representative of a request to output sound data and the sound data to a sound management ECU;
   means for outputting a sound;
   means for analyzing a command, when the command is inputted from the on-vehicle devices, to determine priority of the sound data, and when the sound data is inputted from the on-vehicle devices, outputs a sound corresponding to the inputted sound data in an order of the priority of the sound data; and
   an AI agent that selectively executes a user mode and a vehicle mode, wherein the user mode detects a user's physical condition, and the vehicle mode outputs from the outputting means a sound corresponding to the sound data outputted to the analyzing means from the on-vehicle devices,
   wherein, when executing the vehicle mode, the AI agent acoustically controls at least one of volume, timing and speed of generation of sound for a sound corresponding to the sound data outputted to the analyzing means from the on-vehicle devices based on the user's physical condition detected in the user mode thereby outputting the controlled sound from the outputting means; wherein
   the AI agent increases the volume of the sound and slows down the speed of generation of the sound when the physical condition of the user is determined to be poor.

2. The on-vehicle acoustic control system according to claim 1,
   wherein the AI agent has a function to interact with a user, detects the user's physical condition based on a result of interaction with the user at executing the user mode, and acoustically controls, at executing the vehicle mode, a sound corresponding to the sound data outputted to the analyzing means from the on-vehicle devices based on the result of interaction with the user thereby outputting the controlled sound from the sound output means.

3. The on-vehicle acoustic control system according to claim 1, further comprising:
   means for photographing a user,
   wherein the AI agent has a function to analyze a user's photographic image photographed by the photographing means, detects the user's physical condition based on the user's photographic image at executing the user mode, and acoustically controls, at executing the vehicle mode, a sound corresponding to the sound data outputted to the sound management means from the on-vehicle devices based on the user's photographic image thereby outputting the controlled sound from the outputting means.

4. The on-vehicle acoustic control system according to claim 1, further comprising:
   means for measuring a user's biometric information,
   wherein the AI agent has a function to analyze the user's biometric information measured by the measuring means, detects a user's physical condition based on the user's biometric information at executing the user mode, and acoustically controls, at executing the vehicle mode, a sound corresponding to the sound data outputted to the analyzing means from the on-vehicle devices based on the user's biometric information thereby outputting the controlled sound from the outputting means.

5. The on-vehicle acoustic control system according to claim 1,
   wherein, when executing the vehicle mode, the AI agent acoustically controls a sound corresponding to the sound data outputted to the analyzing means from the on-vehicle devices in conjunction with travel control operation, thereby outputting the controlled sound from the outputting means.

6. The on-vehicle acoustic control system according to claim 1,
   wherein the AI agent periodically monitors whether a command is outputted to the analyzing means from the on-vehicle devices, and when a command is outputted to the analyzing means from the on-vehicle devices in a monitoring timing, executes the vehicle mode, and when a command is not outputted to the analyzing means from the on-vehicle devices in the monitoring timing, executes the user mode.

7. The on-vehicle acoustic control system according to claim 1,
   wherein, when a specified timing is reached after periodically monitoring whether a command is outputted to the analyzing means from the on-vehicle ECUs or the on-vehicle systems when the vehicle mode is being executed, the AI agent determines whether prior received sound data not processed exists in the sound data outputted to the analyzing means from the on-vehicle ECUs or the on-vehicle systems in the monitoring timing, if the prior received sound data not processed exists, stores the prior received sound data not processed as history, and at the time of next execution of the vehicle mode, processes the prior received sound data not processed that is stored as the history.

8. The on-vehicle acoustic control system according to claim 1, wherein the user's physical condition is detected by detecting at least one of the user's facial expression, movement of the user's eyes, movement of the user's mouth, the user's blood pressure, the user's pulse rate and the user's heart rate.

9. An acoustic control method for a vehicle having a plurality of sound generating devices, the method comprising steps of:
   determining priority of sound generation of the sound generating devices when at least two sound generating devices are requested to generate respective sounds;
   detecting indirectly a physical condition of a user in a vehicle; and
   generating requested sound in the vehicle in an order of the priority determined by the determining step and in a manner variable with the physical condition of the user detected by the detecting step by controlling at least one of volume, timing and speed of generation of sound for the requested sound; wherein
   the sound generating devices include an audio device and a voice message generating device for providing information about a travel path of the vehicle;
   the determining step determines that the voice message generating device has a higher priority over the audio device;
   the generating step generates the voice message while reducing a volume of output sound of the audio device in a case that the voice message is requested while the audio device is in a sound generating operation; and
   the generating step increases a volume of the voice message and decreases a speed of the voice message when the detecting step detects that the user is tired.

10. The on-vehicle acoustic control system according to claim 9, wherein the user's physical condition is detected by detecting at least one of the user's facial expression, movement of the user's eyes, movement of the user's mouth, the user's blood pressure, the user's pulse rate and the user's heart rate.

11. A computer-readable memory having an Al agent recorded thereon, the Al agent being used in an on-vehicle acoustic control system comprising on-vehicle devices including at least one of on-vehicle ECUs and on-vehicle systems that output a command representative of a request to output sound data and the sound data to a sound management ECU, means for outputting a sound and means for analyzing a command inputted from the on-vehicle devices to determine the priority of the sound data, and outputs from the outputting means a sound corresponding to the sound data inputted from the on-vehicle devices based on the priority of the sound data,
   wherein the Al agent, is programmed to
      selectively execute a user mode that detects a user's physical condition and a vehicle mode that outputs from the outputting means a sound corresponding to the sound data outputted to the analyzing means from the on-vehicle devices; and
      acoustically control, when executing the vehicle mode, at least one of volume, timing and speed of generation of sound for a sound corresponding to the sound data outputted to the analyzing means from the on-vehicles devices based on the user's physical condition detected in the user mode, thereby outputting a controlled sound from the outputting means; wherein
      the Al agent increases the volume of the sound and slows down the speed of generation of the sound when the physical condition of the user is determined to be poor.

12. The on-vehicle acoustic control system according to claim 11, wherein the user's physical condition is detected by detecting at least one of the user's facial expression, movement of the user's eyes, movement of the user's mouth, the user's blood pressure, the user's pulse rate and the user's heart rate.

* * * * *

UNITED STATES PATENT AND TRADEMARK OFFICE
CERTIFICATE OF CORRECTION

PATENT NO. : 7,636,663 B2 Page 1 of 1
APPLICATION NO. : 11/231085
DATED : December 22, 2009
INVENTOR(S) : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Ninth Day of November, 2010

David J. Kappos
*Director of the United States Patent and Trademark Office*